(12) United States Patent
Arai

(10) Patent No.: US 9,051,975 B2
(45) Date of Patent: Jun. 9, 2015

(54) DUAL CLUTCH TRANSMISSION MECHANISM AND START CONTROL METHOD

(75) Inventor: Katsuhiro Arai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 266 days.

(21) Appl. No.: 13/988,562

(22) PCT Filed: Nov. 21, 2011

(86) PCT No.: PCT/JP2011/006461
§ 371 (c)(1),
(2), (4) Date: May 21, 2013

(87) PCT Pub. No.: WO2012/070216
PCT Pub. Date: May 31, 2012

(65) Prior Publication Data
US 2013/0245901 A1 Sep. 19, 2013

(30) Foreign Application Priority Data
Nov. 22, 2010 (JP) ................................. 2010-260157

(51) Int. Cl.
*F16H 61/688* (2006.01)
*F16D 21/04* (2006.01)
(Continued)

(52) U.S. Cl.
CPC .............. *F16D 21/04* (2013.01); *F16H 61/688* (2013.01); *B60Y 2300/18025* (2013.01); *F16H 2061/023* (2013.01); *F16H 2312/02* (2013.01); *B60Y 2300/186* (2013.01); *B60Y 2300/428* (2013.01);
(Continued)

(58) Field of Classification Search
CPC ........ F16D 48/06; F16D 48/08; F16H 61/688
USPC ........ 701/1, 51, 53, 67; 477/70, 79, 166, 176, 477/180; 74/340
See application file for complete search history.

(56) References Cited

U.S. PATENT DOCUMENTS 6,463,821 B1 * 10/2002 Reed et al. ...................... 74/330
7,601,095 B2 * 10/2009 Hasegawa et al. ............. 477/180
(Continued)

FOREIGN PATENT DOCUMENTS

JP    58-124851 A    7/1983
JP    2002-067741 A  3/2002
(Continued)

OTHER PUBLICATIONS

Official Communication issued in International Patent Application No. PCT/JP2011/006461, mailed on Feb. 21, 2012.

*Primary Examiner* — Helal A Algahaim
*Assistant Examiner* — Genna Mott
(74) *Attorney, Agent, or Firm* — Keating & Bennett, LLP

(57) ABSTRACT

A transmission control device includes even-numbered and odd-numbered transmission gears selected via a shift mechanism and causes the torque capacities of two clutches to be transitioned to a certain proportion until the clutch rotation speed difference of a low-speed gear-side clutch reaches 0 or approximately 0, sets the torque capacity of the clutch on the low-speed gear side to be the total torque capacity of both clutches, and sets the torque capacity of the clutch on the high-speed gear side to 0. The heat load on the clutch at the time when the vehicle starts to move is reduced and the durability thereof is improved, and the clutch can be made smaller and lighter.

5 Claims, 7 Drawing Sheets

(51) Int. Cl.
*F16D 48/08* (2006.01)
*F16D 48/06* (2006.01)
*F16H 61/02* (2006.01)

(52) U.S. Cl.
CPC ............... *F16D 48/08* (2013.01); *F16D 48/06* (2013.01); *F16D 2500/10412* (2013.01); *F16D 2500/30417* (2013.01); *F16D 2500/30426* (2013.01); *F16D 2500/50808* (2013.01); *F16D 2500/50883* (2013.01); *F16D 2500/70426* (2013.01); *F16D 2500/7044* (2013.01)

(56) References Cited

U.S. PATENT DOCUMENTS

| | | | |
|---|---|---|---|
| 8,935,966 B2 * | 1/2015 | Arai | ............... 74/330 |
| 2010/0107792 A1 | 5/2010 | Saitoh | |
| 2010/0107810 A1 | 5/2010 | Saitoh | |

FOREIGN PATENT DOCUMENTS

| | | |
|---|---|---|
| JP | 2008-032184 A | 2/2008 |
| JP | 2010-133555 A | 6/2010 |

* cited by examiner

DUAL CLUTCH TRANSMISSION MECHANISM AND START CONTROL METHOD

BACKGROUND OF THE INVENTION

1. Field of the Invention

The present invention relates to a dual clutch transmission apparatus and a start control method in which a plurality of clutches are controlled.

2. Description of the Related Art

Conventional multi-stage vehicle transmissions having a plurality of clutches enabling fast gear changes on automobiles are known (see, for example, Japanese Patent Application Laid-Open No. 58-124851).

In a multi-stage vehicle transmission disclosed in Japanese Patent Application Laid-Open No. 58-124851, a first clutch connects and disconnects an input shaft that receives the driving force of an engine to and from a first main shaft provided rotatably on the input shaft, and a second clutch connects and disconnects an input shaft to and from a second main shaft provided coaxially with the input shaft.

In this multi-stage vehicle transmission, a sub shaft connected to an output shaft is disposed parallel to the input shaft, the first main shaft, and the second main shaft. This enables transmission at a predetermined gear ratio from either the first main shaft or the second main shaft to the sub shaft through a plurality of gears by the connection of either the first clutch or the second clutch. The output shaft connected to the sub shaft is thereby rotated to output driving force.

Thus, in the above-described multi-stage vehicle transmission, the rotation speed of the output shaft is changed by selectively connecting the first clutch and the second clutch to transmit a torque on the input shaft to the sub shaft at a different gear ratio, without blocking power at the time of the gear change.

In recent years, there has been a demand for providing a motorcycle having a limited mount space with a multi-stage vehicle transmission having a plurality of clutches such as those mounted on an automobile. To mount such a multi-stage vehicle transmission having a plurality of clutches on a motorcycle, it is desirable that the transmission itself is downsized.

In a transmission, a clutch is connected and disconnected on the basis of the state of engagement between a drive-side member and a driven-side member (the relative position of the two members) and has a comparatively large weight as a member of a drive transmission system.

In an arrangement having a plurality of such clutches, the weight of the multi-stage transmission itself may be increased in comparison with a multi-stage transmission having one clutch. This leads to a need to provide a transmission itself that has a small size by reducing the size of a clutch itself.

The size of a clutch is proportional to a thermal load at which the clutch can withstand frictional heat generated in a half-engaging state (in which the clutch slips while transmitting a torque) during connection and disconnection of the clutch, particularly frictional heat generated at the start of travel upon changing from a neutral (N) position to a first gear position. That is, to have a thermal load at which it can withstand frictional heat generated in a half-engaging state, it is required to increase the sizes of the drive-side member and the driven-side member themselves which are to be half-engaged.

That is, in an arrangement in which the clutches are simply reduced in size, a multi-stage transmission cannot withstand a thermal load at the start of travel. The problem is that the multi-stage transmission requires clutches having a size that is large enough to operate under the thermal load at the start of travel and thus, the clutches become heavy.

SUMMARY OF THE INVENTION

Preferred embodiments of the present invention provide a dual clutch transmission apparatus and a start control method capable of reducing thermal loads on the clutches at the time of automatic/manual starting so that the durability is improved and the weight of each clutch is reduced.

According to a preferred embodiment of the present invention, a dual clutch transmission apparatus includes a first clutch that transmits or blocks a torque from a crankshaft to a first main shaft, a second clutch that transmits or blocks a torque from the crankshaft to a second main shaft, an output shaft to which the torque on the first main shaft is transmitted through an odd-numbered transmission gear mechanism including odd-numbered transmission gears, and to which the torque on the second main shaft is transmitted through an even-numbered transmission gear mechanism including even-numbered transmission gears, a transmission mechanism that changes meshing between the gears in the odd-numbered transmission gear mechanism and the gears in the even-numbered transmission gear mechanism, and a transmission control unit that is programmed to change a transmission path for the torque by controlling the transmission mechanism, the first clutch, and the second clutch, in which, at the start of moving a vehicle, in a state in which a predetermined odd-numbered gear and a predetermined even-numbered transmission gear are selected, the transmission control unit is programmed to change the torque capacities of the two clutches while maintaining the torque capacities in a constant proportion until a clutch rotational speed difference in the clutch on a lower transmission gear side becomes zero or close to zero, thereafter to set the torque capacity of the clutch on the lower transmission gear side to the sum of the torque capacities of the two clutches, and also to set the torque capacity of the clutch on a higher transmission gear side to zero.

According to a preferred embodiment of the present invention, a start control method for a dual clutch transmission apparatus includes a first clutch that inputs a torque transmitted from a crankshaft to a first main shaft to output the torque to a drive wheel through an odd-numbered transmission gear mechanism including an odd-numbered transmission gear, and a second clutch that inputs a torque transmitted from the crankshaft to a second main shaft to output the torque to the drive wheel through an even-numbered transmission gear mechanism including an even-numbered transmission gear, the method including a step of setting a predetermined odd-numbered transmission gear and a predetermined even-numbered transmission gear in the odd-numbered transmission gear mechanism and the even-numbered transmission gear mechanism, a step of controlling the first clutch and the second clutch and changing the torque capacities of the two clutches while maintaining the torque capacities in a constant proportion until a clutch rotational speed difference in the clutch on a lower transmission gear side becomes zero or close to zero, and a step of setting the torque capacity of the clutch on the lower transmission gear side to the sum of the torque capacities of the two clutches and setting the torque capacity of the clutch on a higher transmission gear side to zero when the clutch rotational speed difference is zero or close to zero.

According to a preferred embodiment of the present invention, the thermal loads on the clutches at the time of automatic/manual starting can be reduced to improve the durability and reduce the weight of each of the clutches.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the drawings.

A dual-clutch transmission apparatus according to the present preferred embodiment will be described by assuming that a vehicle on which the transmission apparatus is mounted is a motorcycle as a non-limiting example. However, preferred embodiments of the present invention are not limited to this. A controller and a dual-clutch transmission controlled by the controller may be mounted on a four-wheel motor vehicle, a three-wheel motor vehicle or the like, for example.

A dual-clutch transmission controlled by the dual-clutch transmission apparatus according to a preferred embodiment of the present invention will be described with reference to FIG. 1.

Figure 1:
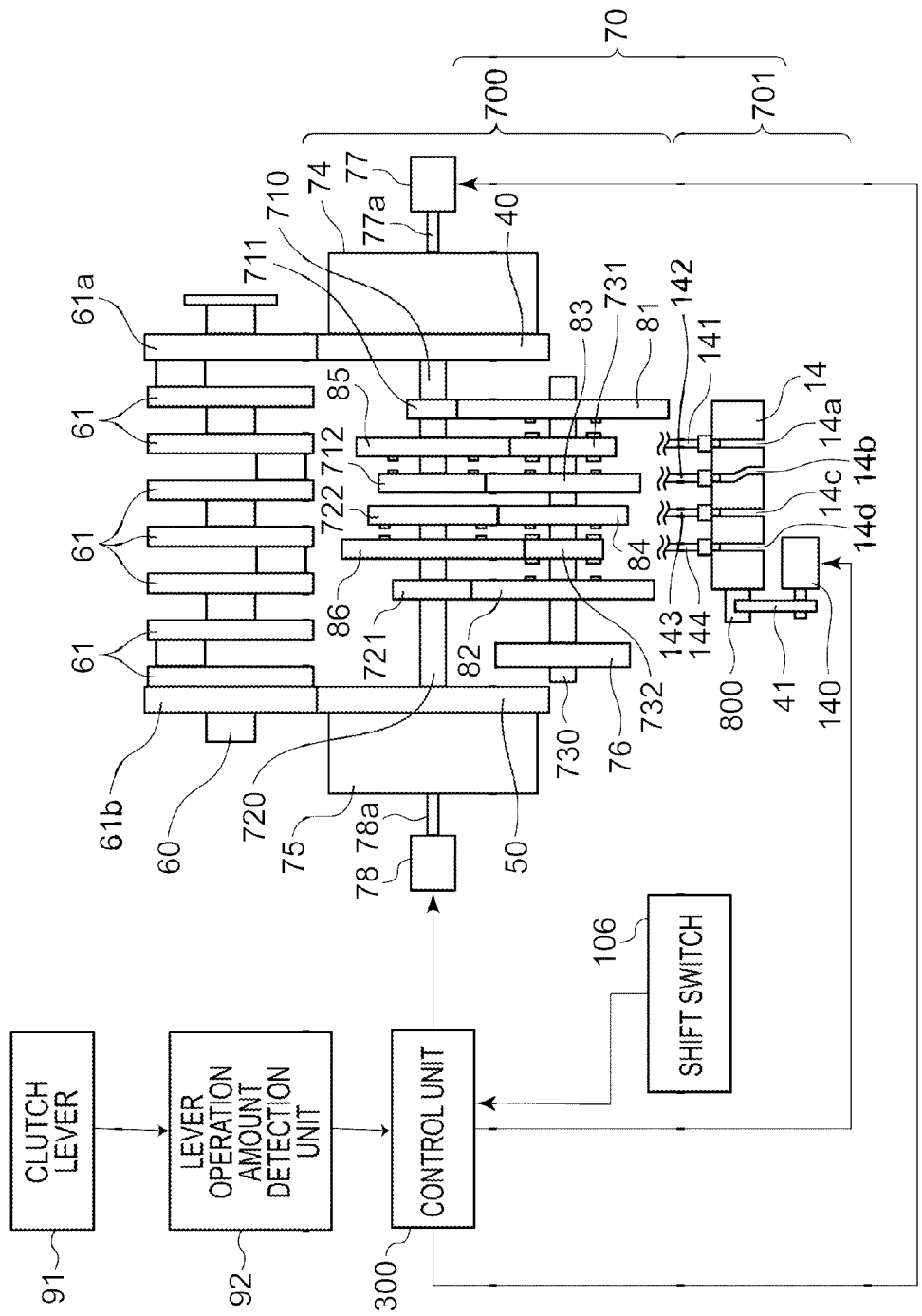
FIG. 1 is a schematic diagram showing the construction of an essential portion of a dual clutch transmission in a dual clutch transmission apparatus according to a preferred embodiment of the present invention.

FIG. 1 is a schematic diagram showing the construction of an essential portion of dual clutch transmission 70 in the dual clutch transmission apparatus according to a preferred embodiment of the present invention.

Dual clutch transmission (DCT) (hereinafter referred to simply as "transmission") 70 is shown in FIG. 1. In transmission 70, a plurality of clutches (first clutch 74 and second clutch 75) are alternately interchanged to enable transmission of a driving force to a gear in an odd stage or a gear in an even stage. Transmission 70 enables a driver to perform a clutch operation (to adjust the clutch capacities of the first clutch 74 and the second clutch 75) by using a by-wire clutch lever 91 in the DCT.

As shown in FIG. 1, transmission 70 includes a transmission mechanism 700 that varies a torque transmitted from a crankshaft 60 of an engine to transmit the torque to a rear wheel (not illustrated) according to an operation of the clutch lever 91, and a shift mechanism 701 that achieves transmission in the transmission mechanism 700 according to an operation of the shift switch 106. The shift switch 106 may be a shift pedal, for example.

Crankshaft 60 is disposed perpendicular or substantially perpendicular to the front-rear direction of the vehicle and horizontal or substantially horizontally (in a lateral direction) in the motorcycle. Crankshaft 60 includes a plurality of crank webs 61. Crank web 61a, which is an external gear disposed on one end of crankshaft 60 meshes with a first primary driven gear (also referred to as "first input gear") 40 in the first clutch 74. Power transmitted from crank web 61a to first input gear 40 by this meshing is transmitted to first main shaft 710 of transmission 70 through first clutch 74. On the other hand, crank web 61b, which is an external gear disposed on the other end of crankshaft 60 meshes with a second primary driven gear (also referred to as "second input gear") 50 in second clutch 75. Power transmitted from crank web 61b to second input gear 50 by this meshing is transmitted to a second main shaft 720 through second clutch 75.

Transmission mechanism 700 includes a first main shaft 710, a second main shaft 720, and a drive shaft (output shaft) 730 disposed parallel or substantially parallel to crankshaft 60, first clutch 74, second clutch 75, gears 81 to 86, 711, 712, 721, 722, 731, and 732 through which power is transmitted between shafts 710 to 730, drive sprocket (hereinafter referred to simply as "sprocket") 76, first clutch actuator 77, and second clutch actuator 78.

First clutch 74 and second clutch 75 are spaced apart from each other in a direction (a left-right direction in the drawing) perpendicular or substantially perpendicular to the front-rear direction of the vehicle to hold first main shaft 710 and second main shaft 720 from opposite lateral sides of the vehicle.

First clutch 74 is provided between crankshaft 60 and first main shaft 710, while second clutch 75 is provided between crankshaft 60 and second main shaft 720.

First clutch actuator 77 and second clutch actuator 78 cause first clutch 74 and second clutch 75, respectively, to transmit a torque outputted from the engine to a downstream side in a torque transmission path or block the torque.

More specifically, first clutch 74 driven by first clutch actuator 77 engages first input gear 40 with first main shaft 710 to transmit to first main shaft 710 rotation power from the engine through crankshaft 60. Also, first clutch 74 driven by first clutch actuator 77 disengages and releases first input gear 40 and first main shaft 710 to block, in a free state, the rotation power to be transmitted from the engine to first main shaft 710. Thus, with the transition from the engaging state to the free state, first clutch 74 gradually reduces the torque transmitted through the clutch (the clutch torque capacity) transmitting rotation power from the engine to first main shaft 710, and, with the transition from the free state to the engaging state, first clutch 74 gradually increases the transmitted torque. In this description, "engaging state" refers to a state in which the rotational speed difference at a clutch is reduced to zero by the clutch torque capacity, and a state in a clutch between the engaging state and the free state is also referred to as "half-engaging state".

First clutch 74 is preferably a clutch of a multi-plate structure including a drive-side portion with friction plates or the like, which rotates together with first input gear 40, and a driven-side portion with clutch plates or the like, which rotates together with first main shaft 710. First clutch 74 is connected to first pull rod 77a of first clutch actuator 77 controlled by a transmission control unit (TCU 110 shown in FIG. 2) of control unit 300. In first clutch 74, when first pull rod 77a is moved in the direction away from first clutch 74, a plurality of clutch plates and a plurality of friction plates are separated from each other to cut the transmission of a torque from first input gear 40 to first main shaft 710, that is, to block the transmission of power to first main shaft 710. On the other hand, when first pull rod 77a is moved to first clutch 74 side, the plurality of clutch plates and the plurality of friction plates attach closely to each other to transmit a torque to first main shaft 710, that is, to transmit power through odd-numbered gears including a group of odd gears (first gear 81, third gear 83, and fifth gear 85).

Second clutch 75 driven by second clutch actuator 78 engages second input gear 50 with second main shaft 720 to transmit to second main shaft 720 rotation power from the engine through crankshaft 60. Also, second clutch 75 driven by second clutch actuator 78 disengages and releases second input gear 50 and second main shaft 720 to block, in a free state, the rotation power to be transmitted from the engine to second main shaft 720. Thus, with the transition from the engaging state to the free state, second clutch 75 gradually reduces the torque transmitted through the clutch (the clutch torque capacity) transmitting rotation power from the engine to second main shaft 720, and, with the transition from the free state to the engaging state, second clutch 75 gradually increases the transmitted torque.

Second clutch 75 is preferably a clutch of a multi-plate structure like first clutch 74. Second clutch 75 includes a drive-side portion with friction plates or the like, which rotates together with second input gear 50, and a driven-side portion with clutch plates or the like, which rotates together with second main shaft 720. Second clutch 75 is connected to second pull rod 78a of second clutch actuator 78 controlled by transmission control unit 110 of control unit 300. In second clutch 75, when second pull rod 78a is moved in the direction away from second clutch 75, a plurality of clutch plates and a plurality of friction plates are separated from each other to cut the transmission of a torque from second input gear 50 to second main shaft 720, that is, to block the transmission of power to second main shaft 720. On the other hand, when second pull rod 78a is moved to second clutch 75 side, the plurality of clutch plates and the plurality of friction plates attach closely to each other to transmit a torque to second main shaft 720, that is, to transmit power through even-numbered gears including a group of even gears (second gear 82, fourth gear 84, and sixth gear 86).

In each of first clutch 74 and second clutch 75, the state in each clutch from the engaging state to the free state is defined with the relative position of the drive-side portion and the driven-side portion. The relative position of the drive-side portion and the driven-side portion is also referred to as "clutch position". The torque transmitted through the clutch (clutch torque capacity) is determined by this clutch position.

Thus, first clutch 74 and second clutch 75 are driven and controlled by control unit 300 (more specifically by TCU 110 shown in FIG. 2) through first clutch actuator 77 and second clutch actuator 78.

Power transmitted to first and second main shafts 710 and 720 is transmitted to drive shaft 730 disposed at a rear position in the vehicle through gears selected as desired from gears 81 to 86, 711, 712, 721, 722, 731, and 732 constituting the transmission stages.

Sprocket 76 is fixed on one end (left end) of drive shaft 730. By the rotation of drive shaft 730, driving force from transmission 70 is transmitted to the rear wheel, which is a drive wheel, through a drive chain (not illustrated) wound around sprocket 76. Thus, a torque produced in the engine is output from drive shaft 730 via first clutch 74 or second clutch 75 and one of the predetermined gear trains corresponding to the transmission stages to drive the rear wheel (drive wheel).

The outside diameter of a power transmitting portion of first main shaft 710 and the outside diameter of a power transmitting portion of second main shaft 720 are substantially equal to each other. The power transmitting portion of first main shaft 710 is a portion through which a driving force outputted to drive shaft 730 through gears in an odd stage (gears 81, 83, 85, 711, 712, and 731) is transmitted. The power transmitting portion of second main shaft 720 is a portion through which a driving force outputted to drive shaft 730 through gears in an even stage (gears 82, 84, 86, 721, 722, and 732) is transmitted. The power transmitting portion of first main shaft 710 and the power transmitting portion of second main shaft 720 are disposed concentrically without interfering with each other. In transmission mechanism 700, first main shaft 710 and second main shaft 720 preferable have outside diameters equal to each other, are disposed side-by-side in left and right positions on one axial line, and are rotated independently of each other.

First main shaft 710 is connected to first clutch 74, while second main shaft 720 is connected to second clutch 75.

On first main shaft 710, the transmission gears (fixed gear 711, fifth gear 85, and spline gear 712) constituting the odd stages are disposed in this order from the base end to which first clutch 74 is connected.

Fixed gear (also referred to as "first-capable gear") 711 is integral with first main shaft 710 and rotates together with first main shaft 710. Fixed gear 711 meshes with first gear (driven-side gear) 81 on drive shaft 730.

Fifth gear 85 is mounted on first main shaft 710 in a position between first-capable fixed gear 711 and third-capable spline gear (third-capable gear) 712 at certain distances from these gears so as to be rotatable about the axis of first main shaft 710 while being prevented from moving in the axial direction.

Fifth gear 85 meshes with spline gear (fifth-capable gear as a driven-side gear) 731 on drive shaft 730.

Spline gear (also referred to as "third-capable gear") 712 is mounted on first main shaft 710 so as to be slidable along the axial direction while being stopped from rotating relative to first main shaft 710 by splines provided along the axial direction on the outer periphery of a fore end of first main shaft 710. Spline gear 712 meshes with third gear (driven-side gear) 83 on drive shaft 730.

Spline gear 712 is moved on first main shaft 710 in the axial direction by the movement of shift fork 142 connected thereto. Spline gear 712 is moved toward fifth gear 85 on first main shaft 710 to be brought into engagement with fifth gear 85, so as to stop fifth gear 85 from rotating (racing) about the axis on first main shaft 710. By engaging spline gear 712 with fifth gear 85, fifth gear 85 is fixed on first main shaft 710 to be able to rotate integrally with the rotation of first main shaft 710.

On the other hand, on second main shaft 720, the transmission gears (fixed gear 721, sixth gear 86, and spline gear 722) constituting the even stages are disposed in this order from the base end to which second clutch 75 is connected.

Fixed gear (also referred to as "second-capable gear") 721 is integral with second main shaft 720 and meshes with second gear (driven-side gear) 82 on drive shaft 730.

Sixth gear 86 is mounted on second main shaft 720 in a position between second-capable fixed gear 721 and spline gear 722, which is a fourth-capable gear, at certain distances from these gears so as to be rotatable about the axis of second main shaft 720 while being stopped from moving in the axial direction. Sixth gear 86 meshes with spline gear 732 (sixth-capable gear as a driven-side gear) on drive shaft 730.

Spline gear (also referred to as "fourth-capable gear") 722 is mounted on second main shaft 720 so as to be slidable along the axial direction while being prevented from rotating relative to second main shaft 720 by splines provided along the axial direction on the outer periphery of a fore end of second main shaft 720. Spline gear 722 meshes with fourth gear (driven-side gear) 84 on drive shaft 730.

Spline gear 722 is moved on second main shaft 720 in the axial direction by the movement of shift fork 143 connected thereto. Spline gear 722 is moved toward sixth gear 86 on second main shaft 720 to be brought into engagement with sixth gear 86, so as to stop sixth gear 86 from rotating (racing) about the axis on second main shaft 720. By engaging spline gear 722 with sixth gear 86, sixth gear 86 is fixed on second main shaft 720 to be able to rotate integrally with the rotation of second main shaft 720.

On the other hand, on drive shaft 730, first gear 81, spline gear (fifth-capable gear) 731, third gear 83, fourth gear 84, spline gear (sixth-capable gear) 732, second gear 82, and sprocket 76 are disposed in this order from first clutch 74 side. First gear 81, third gear 83, fourth gear 84, and second gear 82 are provided on drive shaft 730 so as to be rotatable on drive shaft 730 while being prohibited from moving along the axial direction of drive shaft 730.

Spline gear (also referred to as "fifth-capable gear") 731 is mounted so as to be slidable on drive shaft 730 in a thrust direction and rotatable with drive shaft 730. Spline gear 731 is connected to shift fork 141 of shift mechanism 701. With a movement of shift fork 141, spline gear 731 is moved on drive shaft 730 along the axial direction.

Spline gear (also referred to as "sixth-capable gear") 732 is mounted so as to be movable on drive shaft 730 in a thrust direction and rotatable with drive shaft 730. Spline gear 732 is connected to shift fork 144 of shift mechanism 701. With a movement of shift fork 144, spline gear 732 is moved on drive shaft 730 along the axial direction.

Spline gears 712, 722, 731, and 732 respectively function as transmission gears and also function as dog selectors. More specifically, projections and recesses fitting each other are provided on surfaces facing each other of spline gears 712, 722, 731, and 732 and the transmission gears adjacent to spline gears 712, 722, 731, and 732 in the axial direction. By fitting the projections and recesses to each other, each pair of gears rotates integrally.

Thus, spline gears 712, 722, 731, and 732 are moved in the axial direction by driving connected shift forks 141 to 144 so that each spline gear is connected to the transmission gear (in first gear 81 to sixth gear 86) adjacent to the spline gear in the axial direction by the dog mechanism.

Gear shifting to be performed on gears 81 to 86, 711, 712, 721, 722, 731, and 732 in transmission mechanism 700 is performed with shift forks 141 to 144 movable with the rotation of shift cam 14 in shift mechanism 701.

Shift mechanism 701 that selects a gear in transmission mechanism 700 includes shift cam drive apparatus 800 that rotatingly drives shift cam. 14 with which shift forks 141 to 144 are operated, motor 140, and transfer mechanism 41 that connects motor 140 and shift cam drive apparatus 800 and transmits the driving force of motor 140 to shift cam drive apparatus 800.

Shift forks 141 to 144 span between spline gears 731, 712, 722, and 732, respectively, and shift cam 14. Shift forks 141 to 144 are disposed by being spaced apart from each other along the axial directions of first and second main shafts 710 and 720, drive shaft 730 and shift cam 14. Shift forks 141 to 144 are arranged parallel or substantially parallel to each other, each fork being movable along the axial direction of the axis of rotation of shift cam 14.

Shift forks 141 to 144 include pin portions on their base end sides movably disposed respectively in four cam grooves 14a to 14d provided in the outer circumferential surface of shift cam 14. In other words, shift forks 141 to 144 are driven members on shift cam 14 provided as a drive member. Shift forks 141 to 144 are slidingly moved along the axial directions of first and second main shafts 710 and 720 and drive shaft 730 according to the profiles of cam grooves 14a to 14d of shift cam 14. By this sliding movement, each of spline gears 731, 712, 722, and 732 connected to extreme ends is moved along the axial direction on the shaft passed through its bore.

Shift cam 14 has a cylindrical shape and is disposed so that the axis of rotation is parallel or substantially parallel to first main shaft 710, second main shaft 720, and drive shaft 730.

Shift cam 14 is driven and rotated by the driving force of motor 140 transmitted to shift cam drive apparatus 800 through transfer mechanism 41. By this rotation, at least one of shift forks 141 to 144 according to the profiles of cam grooves 14a to 14d is moved along the axial direction of the axis of rotation of shift cam 14.

With the movements of some of shift forks 141 to 144 movable by following the rotation of shift cam 14 including such cam grooves 14a to 14d, the spline gears connected to the moving shift forks are moved, thus performing gear shifting in transmission 70 (transmission mechanism 700).

In transmission 70 including transmission mechanism 700, the driving force of the engine from crankshaft 60 is outputted through one of the independent two systems including first main shaft 710 and second main shaft 720 and through drive shaft 730 by the operations of first clutch 74 and second clutch 75 and the corresponding operation of shift mechanism 701. With the rotation of drive shaft 730, driven sprocket 76 rotates to drive the rear wheel through the chain.

Figure 2:
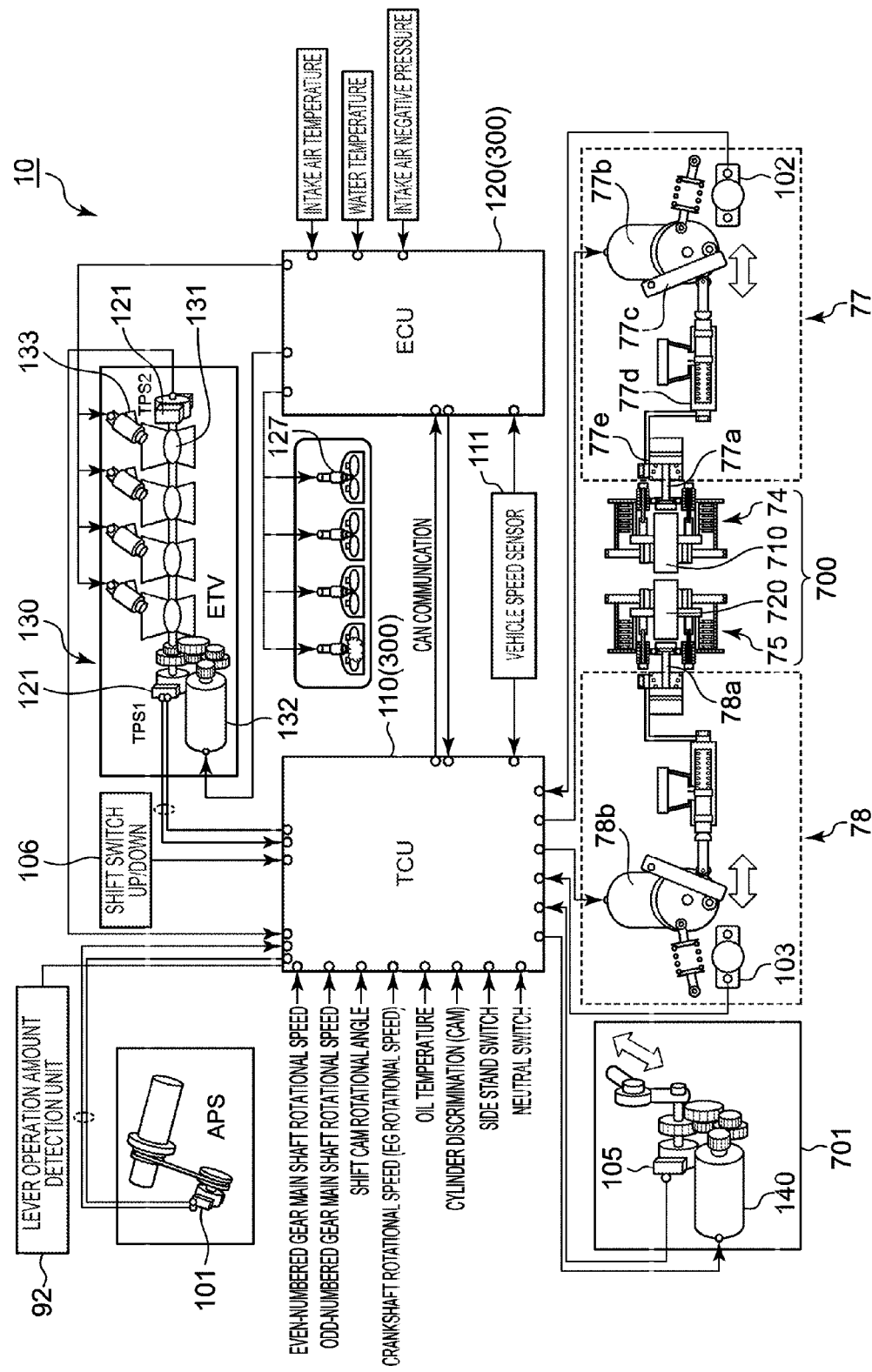
FIG. 2 is a schematic diagram showing a control system for a motorcycle including the dual clutch transmission apparatus according to a preferred embodiment of the present invention.

First and second clutch actuators 77 and 78 of transmission mechanism 700 and motor 140 that drives shift forks 141 to 144 in shift mechanism 701 are controlled by control unit 300 in control system 10 (see FIG. 2).

FIG. 2 is a schematic diagram showing the control system for the motorcycle including the dual clutch transmission apparatus according to a preferred embodiment of the present invention. In FIG. 2, the body of the engine is not illustrated.

In the control system (control apparatus) 10 shown in FIG. 2, control unit 300 includes a TCU (transmission control unit) 110 and an ECU (engine control unit) 120. Between transmission control unit 110 and engine control unit 120, various sorts of data are exchanged as information by data communication such as CAN communication.

That is, information inputted to transmission control unit 110 through CAN communication is inputted to engine control unit 120, and information inputted to engine control unit 120 is also inputted to transmission control unit 110 through CAN communication. Thus, transmission control unit 110 and engine control unit 120 share the inputted information with each other, transmission control unit 110 mainly controls drive of transmission 70, and engine control unit 120 controls drive of the engine.

Each of transmission control unit 110 and engine control unit 120 includes, for example, a microcomputer and performs signal processing according to a program or programs stored in advance in a ROM while using a temporary storage function of a RAM. A rewritable ROM may also be used as a storage function and may be used while being rewritten as required.

Transmission control unit 110 and engine control unit 120 control driving of a motorcycle (portions of the vehicle including transmission mechanism 700, shift mechanism 701, the engine or the like) based on signals inputted from sensors and lever operation amount detection unit 92 that detects the operation amounts of shift switch 106 and clutch lever 91 provided on the motorcycle.

A plurality of sensors are connected to transmission control unit 110. FIG. 2 shows clutch lever 91, accelerator opening sensor (accelerator position sensor) 101, clutch position sensors (clutch angle sensors) 102 and 103, shift position sensor (transmission stage detection unit) 105, shift switch 106, drive shaft rotational speed detecting sensor (referred to as "vehicle speed sensor") 111, and throttle opening sensor 121 as the sensors connected to transmission control unit 110.

Clutch lever 91 is gripped by the driver to adjust the states of engagement in the clutches. Clutch lever 91 is disposed, for example, on the left one of the handlebars and can be gripped together with the left-hand grip by the driver.

Clutch lever 91 is operated using a by-wire system. The amount of operation on the lever gripped by the driver is detected by lever operation amount detection unit 92.

Lever operation amount detection unit 92 converts the detected lever operation amount into an electrical signal and outputs this signal to control unit 300 (more specifically transmission control unit 110).

Information inputted from sensors 101 to 103, 105, 111, and 121 and shift switch 106 to transmission control unit 110 is the accelerator opening, the clutch positions of first clutch 74 and second clutch 75 (the relative position of the drive-side portion and the driven-side portion of each clutch), the rotational speed of drive shaft 730, the opening of an electromagnetic throttle (the position of throttle valve 131 of an electromagnetic throttle).

Various kinds of information other than those from sensors 101 to 103, 105, 111, and 121 and shift switch 106 are inputted to transmission control unit 110 by other sensors and elements not illustrated. For example, information including the rotational speed of first main shaft 710 (shown as "odd-numbered gear main shaft rotational speed" in FIG. 2), the rotational speed of second main shaft 720 (shown as "even-numbered gear main shaft rotational speed" in FIG. 2), the rotational angle of shift cam 14, and the rotational speed of crankshaft 60 (engine (EG) rotational speed) is inputted to transmission control unit 110.

Further, cylinder discrimination information, side stand switch (side stand SW) information, and neutral switch (neutral SW) information indicating that the transmission gears are in a neutral position are inputted to transmission control unit 110 from a cylinder discrimination sensor (cam sensor), a side stand switch, and a neutral switch, which are not illustrated.

Engine control unit 120 is also connected to electronically controlled throttle 130, injector 133 of the engine, and ignition 127. The engine is controlled by using these connected components. Information including the intake air temperature, the water temperature, and the intake air negative pressure is inputted to engine control unit 120 from sensors connected thereto.

Accelerator opening sensor (accelerator position sensor) 101 detects the amount of a driver's operation on the accelerator and outputs the detected operation amount to transmission control unit 110. According to this accelerator operation amount, transmission control unit 110 and engine control unit 120 control drive of the components.

Clutch position sensors (clutch angle sensors) 102 and 103 detect the state of engagement in first clutch 74 attained by first clutch actuator 77 and the state of engagement in second clutch 75 attained by second clutch actuator 78 (also referred to as "clutch position"). The detected clutch positions (the degrees of transmission of torques by the clutches) are outputted to transmission control unit 110.

More specifically, clutch position sensor 102 detects the angle of rotation of motor 77b according to the amount of operation of first pull rod 77a. Clutch position sensor 102 can detect the angle of rotation of motor 77b to detect the amount of separation between the plurality of clutch plates and the plurality of friction plates adjusted according to the amount of operation of first pull rod 77a, i.e., the state of engagement in first clutch 74. Clutch position sensor 103 also has the same function as that of clutch position sensor 102, and detects the angle of rotation of motor 78b corresponding to the amount of operation of second pull rod 78a to detect the state of engagement in second clutch 75. That is, clutch position sensor 103 detects the amount of separation between the plurality of clutch plates and the plurality of friction plates in second clutch 75, i.e., the state of engagement (clutch position) in second clutch 75, and outputs the detected amount to transmission control unit 110.

Output shaft rotational speed detecting sensor (referred to as "vehicle speed sensor") 111 detects the rotational speed of drive shaft 730 of transmission 70 (the drive shaft rotational speed corresponding to the vehicle speed) and outputs the detected rotational speed to transmission control unit 110 and engine control unit 120.

Shift position sensor (transmission stage detection unit) 105 detects the position of the gears defining the predetermined transmission stages (the first to sixth speeds and neutral) by the operation of motor 140 in shift mechanism 701 and outputs the detected gear position to transmission control unit 110.

Shift switch 106 includes a shift-up button and a shift-down button, not illustrated. By depressing the shift-up button or the shift-down button, transmission 70 achieves transmission.

That is, when the driver depresses the shift-up button or the shift-down button of shift switch 106, a signal indicating that the button has been depressed (hereinafter referred to as "shift signal") is outputted from shift switch 106 to transmission control unit 110 (control unit 300). Control unit 300 controls motor 140 based on this shift signal to rotate shift cam 14 so that shift forks 141 to 144 are driven as desired, so as to perform a transmission stage change operation (gear shifting) in transmission 70 (more specifically in transmission mechanism 700).

In the present preferred embodiment, a shift-up operation from the present transmission stage is executed in transmission 70 in response to depressing the shift-up button by the driver, and a shift-down operation from the present transmission stage is executed in transmission 70 in response to depressing the shift-up button by the driver.

First clutch actuator 77 adjusts the engaging force applied to first main shaft 710 in first clutch 74, i.e., a torque transmitted from first clutch 74 to first main shaft 710, based on a control command from transmission control unit 110. Transmission or blocking of power from the engine to first main shaft 710 is performed in this way to cause the vehicle to start or stop.

First clutch actuator 77 in the present preferred embodiment changes the torque capacity of first clutch 74 through, for example, hydraulic pressure to adjust the torque transmitted through first clutch 74. In first clutch actuator 77, motor 77b controlled by transmission control unit 110 drives master cylinder 77d through a link 77c to feed a hydraulic operating fluid to slave cylinder 77e.

By the hydraulic operating fluid flowing into slave cylinder 77e, first pull rod 77a urged toward first clutch 74 is moved in the direction of moving away from first clutch 74. The engaging force, i.e., the transmitted torque capacity (hereinafter referred to as "torque capacity"), in first clutch 74 is reduced to block a torque transmitted from the engine (more specifically from crankshaft 60) to first main shaft 710. With the movement of first pull rod 77a in the direction moving away from first clutch 74 as described above, first clutch 74 is released. Also, first pull rod 77a driven by motor 77b is released from the state of moving away from first clutch 74 to move toward first clutch 74.

The engaging force of first clutch 74 (in other words, the clutch torque capacity) is thus increased, so that the torque transmitted from the engine to first main shaft 710 is increased. First clutch 74 transmits the torque from the engine to first main shaft 710.

Second clutch actuator 78 changes the engaging force applied to second main shaft 720 in second clutch 75, i.e., the torque capacity of second clutch 75, based on a control command from transmission control unit 110, to adjust a torque transmitted from second clutch 75 to second main shaft 720. Transmission or blocking of power from the engine to second main shaft 720 is performed in this way to cause the vehicle to start or stop.

Second clutch actuator 78 has a construction similar to that of first clutch actuator 77 and drives second clutch 75 by the same operation as that by which first clutch actuator 77 drives first clutch 74.

Further, first clutch actuator 77 and second clutch actuator 78 achieve transmission during traveling by operating first clutch 74 and second clutch 75 so that the torque transmission path in the transmission is changed.

While first clutch actuator 77 and second clutch actuator 78 have been described as a hydraulic type, first clutch actuator 77 and second clutch actuator 78 may be of any other type, e.g., an electric-type if they are constructed so as to adjust the engaging forces applied to the clutches (equivalent to "transmitted torque capacity of the clutch").

In shift mechanism 701, motor 140 drives, based on a control command from transmission control unit 110 in response to an input from shift switch 106, drive shift cam drive apparatus 800 through transfer mechanism 41. By drive with shift cam drive apparatus 800, shift cam 14 is driven and rotated. With the rotation of shift cam 14, shift forks 141 to 144 (see FIG. 1) mounted in the transmission are selectively operated. At least one of first main shaft 710 and second main shaft 720, which are transmission input shafts, and drive shaft 730 are connected through the desired one of the pair of gears to define the predetermined transmission stage.

Throttle opening sensor 121 detects the opening of throttle valve 131 of electronically controlled throttle 130 and outputs a signal representing the opening to transmission control unit 110. Transmission control unit 110 performs transmission control by using the opening of the throttle valve (throttle opening) inputted from throttle opening sensor 121 and outputs the throttle opening to engine control unit 120 to enable feedback control.

Electronically controlled throttle 130 is driven based on a control command from engine control unit 120. Electronically controlled throttle 130 drives motor 132 to adjust the opening of throttle valve 131 provided in the engine air intake system.

Engine control unit 120 controls the drive of the engine based on information inputted through transmission control unit 110, the information including the opening of throttle valve 131, the rotational speed of the engine, and the accelerator operation amount. In this control, engine control unit 120 controls the torque of the engine according to a command with a target engine torque to determine the torque of the engine, the command being inputted from transmission control unit 110. This required torque is controlled, for example, on the basis of a three-dimensional MAP to calculate the throttle valve opening based on information from the APS (accelerator opening (position) sensor) 101 and the engine rotational speed (corresponding to the rotational speed of crankshaft 60). By this control, in a region called "over venturi", a reduction in an intake air flow rate is prevented by limiting the throttle opening to improve the charging efficiency. Additionally, in a region where the torque rises, the throttle opening is also limited. This expands an overall torque characteristic.

Based on the target engine torque command inputted as described above, engine control unit 120 controls the torque produced by the engine by operating electronically controlled throttle 130 or by changing the ignition timing with ignition 127. The target engine torque is calculated in transmission control unit 110. However, calculation of a target engine torque may alternatively be performed in engine control unit 120.

At the start of travel, transmission control unit 110 controls the operations of first clutch actuator 77, second clutch actuator 78, and shift mechanism 701 according to a predetermined timing by receiving the amount of lever operation on clutch lever 91 and a shift signal of shift switch 106, in addition to outputs of a required torque based on inputted signals. By the operations of first clutch actuator 77, second clutch actuator 78, and shift mechanism 701, first clutch 74, second clutch 75, and the transmission gears are operated to perform a transmission stage change operation.

During traveling, transmission control unit 110 receives the lever operation amount information from lever operation amount detection unit 92 and a transmission stage command from shift switch 106, and calculates a target engine torque and a target clutch torque based on inputted information (the accelerator opening, the engine rotational speed, the rotational speed of first main shaft 710, the rotational speed of second main shaft 720, the rotational speed of drive shaft 730, and the angle of rotation of the shift cam). Transmission control unit 110 calculates a target throttle opening, a target rotation angle of shift cam 14, and a target clutch position in first clutch 74 or second clutch 75 based on the calculated target engine torque and target clutch torque. Transmission control unit 110 controls the drive of first clutch actuator 77, second clutch actuator 78, and motor 140 by using the results of these calculations to change the torque transmission path in transmission 70.

In other words, during a transmission period, transmission control unit 110 increases to the target value the clutch torque capacity of the clutch on the next stage side that transmits a torque to the pair of gears in the target transmission stage (the transmission stage after interchange (next stage)), and thereafter reduces the clutch torque capacity of the clutch on the preceding stage side that transmits a torque to the pair of gears in the transmission stage before interchange (preceding stage), so as to change the torque transmission path.

At the start of moving the vehicle, transmission control unit 110 causes the vehicle to start by controlling first clutch actuator 77, second clutch actuator 78, and motor 140 in shift mechanism 701 in association with engine drive control performed by engine control unit 120.

When performing this vehicle start control, transmission control unit 110 first controls transmission mechanism 700 so that each of the odd-numbered transmission gear mechanism and even-numbered transmission gear mechanism is in such a meshing state as to have the highest gear ratio. More specifically, transmission control unit 110 selects the second gear and the first gear (2-1 state) through shift mechanism 701 and increases the torque capacity of second clutch 75 through second clutch actuator so that a torque is transmitted to the second gear.

Thereafter, transmission control unit 110 controls the drive of clutches 74 and 75 to perform a transmission stage change operation at the start of travel, i.e., a clutch interchange operation at the start of travel (hereinafter referred to as "starting clutch interchange control"). In starting, upon setting the predetermined odd-numbered and even-numbered transmission gears through shift mechanism 701 at the start of moving the vehicle, transmission control unit 110 changes the torque capacities of the two clutches while maintaining these torque capacities in a constant proportion until the clutch rotational speed difference in the clutch on the lower transmission gear side becomes zero or close to zero, and thereafter sets the torque capacity of the clutch on the lower transmission gear side to the sum of the torque capacities of the two clutches while controlling the torque capacity of the clutch on the higher transmission gear side to zero, so as to perform the interchange. The clutch rotational speed difference referred to here is the difference in rotational speed in the single clutch between the drive side (corresponding to the upstream side in the power transmission path in the clutch) and the driven side (corresponding to the downstream side in the power transmission path in the clutch).

The functions of transmission control unit 110 that performs such start control will be described.

Figure 3:
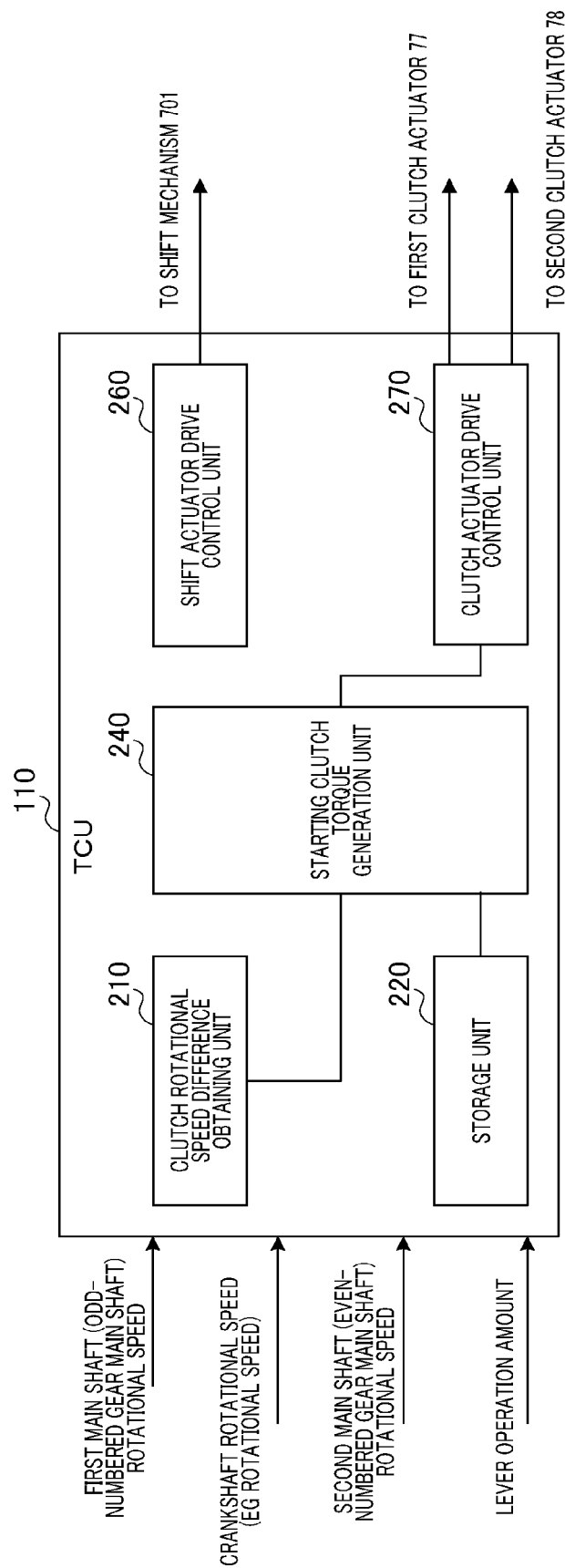
FIG. 3 is a function block diagram for explaining start control with a transmission control unit in the dual clutch transmission apparatus according to a preferred embodiment of the present invention.

FIG. 3 is a function block diagram for explaining start control performed by the transmission control unit in the dual clutch transmission apparatus according to a preferred embodiment of the present invention.

Transmission control unit (TCU) 110 includes clutch rotational speed difference obtaining unit 210, storage unit 220, starting clutch torque generation unit 240, shift actuator drive control unit 260, and clutch actuator drive control unit 270.

Based on the first main shaft rotational speed, the second main shaft rotational speed, and the engine rotational speed which are inputted, clutch rotational speed difference obtaining unit 210 obtains the difference between the rotational speed on the upstream side (drive side) and the rotational speed on the downstream side (driven side) in the power transmission path in each clutch drive-controlled by transmission control unit 110. The clutch rotational speed difference obtained in this way is outputted to starting clutch torque generation unit 240.

At the start of travel, clutch rotational speed difference obtaining unit 210 calculates the rotational speed difference in first clutch 74 (referred to as "clutch 1 rotational speed difference" in some case) and outputs the calculated rotational speed difference to starting clutch torque generation unit 240.

More specifically, clutch rotational speed difference obtaining unit 210 calculates the clutch rotational speed difference between the rotational speed of first main shaft 710 on the driven portion side in first clutch 74 (the clutch downstream rotational speed) inputted at the start of travel and the clutch upstream rotational speed obtained as the product of the rotational speed of crankshaft 60 (engine rotational speed) and the primary gear reduction ratio. Clutch rotational speed difference obtaining unit 210 outputs the calculated clutch rotational speed difference in first clutch 74 to starting clutch torque generation unit 240.

Storage unit 220 stores data and programs used for drive control of transmission 70 in TCU 110. More specifically, storage unit 220 stores transmission gear ratio information representing the ratios of the transmission gears, a "clutch lever operation amount-torque conversion map" and a "clutch position-torque conversion map", for example.

The "clutch lever operation amount-torque conversion map" is a map in which the amount of operation of the clutch lever operated by the driver (lever operation amount) and the torque transmitted through the clutch (clutch torque) are associated with each other. This "clutch lever operation amount-torque conversion map" is used when a lever operation amount is converted into a total torque target value of the clutch torque (total clutch torque target value). The total torque target value is a value necessary to start the vehicle (a value at which the vehicle starts moving), i.e., a value at which the torque is transmitted to the drive wheel (rear wheel) to rotatingly drive the drive wheel so that the vehicle moves.

The "clutch position-torque conversion map" is a map in which torque target values for clutches 74 and 75 are associated with target values of the clutch positions in the clutches (target values of clutch 1 and clutch 2). A torque target value is converted into a target value of the clutch position.

Using these maps, starting clutch torque generation unit 240 in TCU 110 calculates clutch torques (more specifically clutch position target values) and outputs the calculated clutch torques to clutch actuator drive control unit 270. Thus, the two clutches 74 and 75 are torque-controlled.

The "clutch lever operation amount-torque conversion map" and the "clutch position-torque conversion map" are read to starting clutch torque generation unit 240 at the start of travel, and are used to calculate clutch torque capacity command values (clutch position target values) with respect to first clutch 74 and second clutch ("clutch interchange at the start of travel").

Starting clutch torque generation unit 240 performs starting clutch torque control including operating two clutch torques in a constant proportion according to the gear ratio and causing a start upon making the interchange when the rotational speed difference on the lower gear side is reduced. The above-described constant proportion divides the proportions to equalize thermal loads on the clutches as shown by expressions (9) and (10) described below.

More specifically, upon setting the predetermined odd-numbered and even-numbered transmission gears at the start of moving the vehicle, starting clutch torque generation unit 240 performs starting clutch torque control by changing the torque capacities of the two clutches while maintaining these torque capacities in a constant proportion until the clutch rotational speed difference in the clutch on the lower transmission gear side becomes zero or close to zero, and thereafter setting the torque capacity of the clutch on the lower gear side to the sum of the torque capacities of the two clutches and also setting the torque capacity of the clutch on the higher gear side to zero.

"Calculation of thermal loads at the start of travel" in starting clutch torque generation unit 240 by which dividing the proportions to equalize thermal loads on the clutches are calculated will now be described.

Examination of the heat capacity will first be described.

Figure 4:
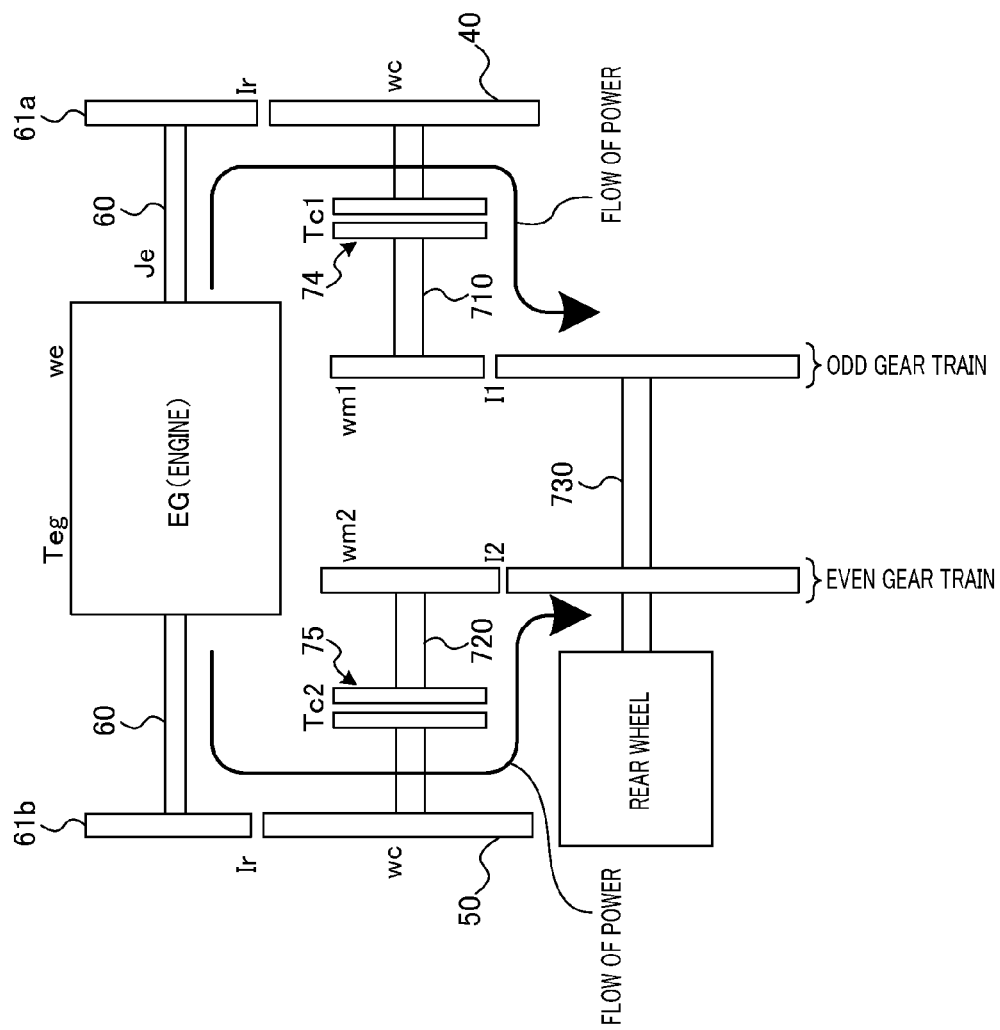
FIG. 4 is a schematic diagram of the transmission for explaining a start control in the dual clutch transmission apparatus according to a preferred embodiment of the present invention.

FIG. 4 is a schematic diagram of the transmission for explanation of start control in the dual clutch transmission apparatus according to a preferred embodiment of the present invention.

In FIG. 4, Tc1 represents the torque capacity of first clutch 74 (corresponding to "torque transmitted through the clutch"); Tc2, the torque capacity of second clutch 75; Teg, a clutch shaft (main shaft) converted-value of the engine (EG) torque; and Ir, the primary-side gear reduction ratio of the clutches. Also, the gear reduction ratio for the first speed on first clutch 74 side is represented by, for example, the gear reduction ratio 11 on the first speed side, and the gear reduction ratio for the second speed on second clutch 75 side is represented by, for example, the gear reduction ratio 12 on the second speed side. Further, we=we*Ir represents the input rotational speed inputted to each clutch after primary speed reduction through input gear 40 or 50, i.e., the primary-side rotational speed of the clutch. In FIG. 4, "ω" is expressed by "w".

Also, ωm1 represents the clutch rotational speed on the downstream side (driven side) in the first-gear-side clutch (first clutch 74), i.e., the secondary-side rotational speed of first clutch 74, and ωm2 represents the clutch rotational speed on the downstream side (driven side) in the second-gear-side clutch (second clutch 75), i.e., the secondary-side rotational speed of second clutch 75. Tr represents the total clutch torque (corresponding to the operation of clutch lever 91). The above-described symbols are listed below.

Teg: Clutch shaft converted-value of the engine torque
We: EG angular velocity
Je: EG inertia
Tc1: Clutch torque capacity
Tc1t: Clutch transmitted torque
I1, I2: Gear reduction ratio
Jv: Vehicle inertia
Wv: Vehicle angular velocity
T1: Rear wheel load
Tr: Required torque*
Ne: Target rotational speed
wc: Primary-side rotational speed
wm: Secondary-side rotational speed Thermal energy Ec generated in the clutch at the start of travel is shown by the following expression (1) in which the product of the transmitted torque and the difference between the primary and secondary angular velocities of the clutch (slippage) is integrated with respect to time:

[1]

$$Ec = \int Tcl^{*}(wc(t)-wm(t))^{*}dt \qquad \text{(Equation 1)}$$

If Tcl and wc in the above expression (1) and FIG. 4 are constant values and wm is linear, thermal energy Ec generated in the clutch at the start of travel is shown by the following expression (2) in which the area of the difference in angular velocity between the primary-side rotational speed and the secondary-side rotational speed in the clutch is multiplied by the transmitted torque and the time period until engagement:

[2]

$$Ec = Tcl * \frac{wc + wc - wm(Tst)}{2} * Tst \qquad \text{(Equation 2)}$$

The first-gear-side clutch until the completion of engagement is considered and the second-gear-side clutch until the completion of engagement in the first-gear-side clutch is considered. Accordingly, the secondary-side angular velocities of the clutches at the time of engagement are shown from the gear ratios by the following expressions (3) and (4):

[3]

$$wm1(Tst) = wc \qquad \text{(Equation 3)}$$

$$wm2(Tst) = \frac{i2}{i1} * wc \qquad \text{(Equation 4)}$$

Therefore, thermal energy Ec1 generated in the first-gear-side clutch and thermal energy Ec2 generated in the second-gear-side clutch are shown by the following expressions (5) and (6):

[4]

$$Ec1 = Tc1 * \frac{wc}{2} * Tst \qquad \text{4 (Equation 5)}$$

$$Ec2 = Tc2 * \frac{2wc - \frac{i2}{i1}wc}{2} * Tst \qquad \text{(Equation 6)}$$

Since the EG rotational speed is constant, the engine torque and the sum of the clutch torques balance with each other. Therefore, the engine torque Teg is shown by the following expression (7):

$$Teg = Tc1 + Tc2 \qquad \text{(Equation 7)}$$

The thermal energy generated in the two clutches are equally divided in order to minimize the thermal loads on the clutches. Therefore, the following expression (8) is given:

$$Ec1 = Ec2 \qquad \text{(Equation 8)}$$

Tc1 and Tc2 satisfying the above expressions (5) to (8) are determined. That is, expression (7) is substituted in the above expressions (5) and (6) to determine "divided proportions to equalize the thermal loads on the clutches" by the following expressions (9) and (10):

[5]

$$Tc1 = \frac{2i1 - i2}{3i1 - i2} * Teg \qquad \text{(Equation 9)}$$

$$Tc2 = \frac{i1}{3i1 - i2} * Teg \qquad \text{(Equation 10)}$$

The above expressions (9) and (10) are expressions showing "dividing proportions to equalize the thermal loads on the clutches by constant-ratio starting", which were first discovered by the inventors of the present invention. Gear reduction ratios i1 and i2 are substituted in the divided proportions. For example, if gear reduction ratios i1=2.533 and i2=2.063 are substituted, Tc1 and Tc2 are as shown by the following expressions (11) and (12):

$$Tc1 = 0.5424 * Teg \qquad \text{(Equation 11)}$$

$$Tc2 = 0.4576 * Teg \qquad \text{(Equation 12)}$$

As a result, the generated thermal energies in the two clutches are equal to each other and shown by the following expression (13):

$$Ec1 = Ec2 = 0.5424 * Teg * \frac{wc}{2} * Tst \quad \text{[6]} \quad \text{(Equation 13)}$$

On the other hand, an ordinary case of starting at the first speed only is shown by the following expression (14) from the above expression (13):

$$Ec = Teg * \frac{wc}{2} * Tst \quad \text{[7]} \quad \text{(Equation 14)}$$

As a result, the thermal load reduction rate: Ec12/Ec in the present preferred embodiment is shown by the following expression (15):

$$Ec12/Ec=0.5424 \quad \text{(Equation 15)}$$

Processing in starting clutch torque generation unit 240 will next be described in detail.

Figure 5:
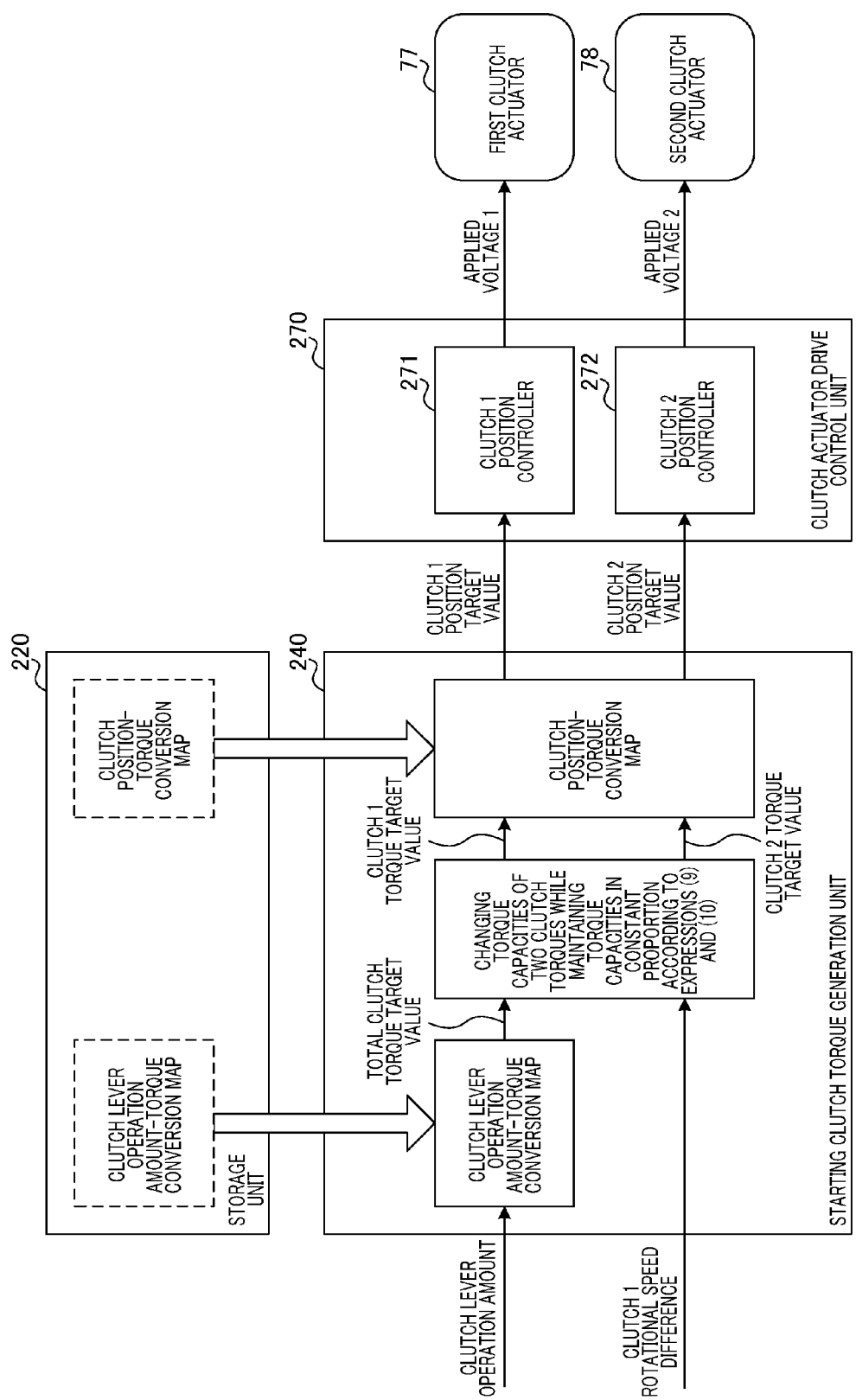
FIG. 5 is a diagram for explaining a starting clutch torque generation unit in a preferred embodiment of the present invention.

FIG. 5 is a diagram for explaining a starting clutch torque generation unit in a preferred embodiment of the present invention.

As shown in FIG. 5, starting clutch torque generation unit 240 in TCU 110 calculates a total clutch torque target value by converting a clutch lever operation amount inputted from clutch lever 91 into the total clutch torque target value by using the "clutch lever operation amount-torque conversion map" read out from storage unit 220. That is, a total clutch torque target value is calculated by the "clutch lever operation amount-torque conversion map" set in advance according to the operation of clutch lever 91.

Starting clutch torque generation unit 240 calculates transmitted torque target values for the clutches (clutch torque target values) by using the calculated total clutch torque target value, the clutch 1 (first clutch 74) rotational speed difference inputted from clutch rotational speed difference obtaining unit 210 and expressions (9) and (10) to change the torque capacities of the two clutches while maintaining these torque capacities in a constant proportion (for operating the two clutch torques in a constant proportion according to a gear ratio in the present preferred embodiment).

The transmitted torque target values for the clutches calculated in this way are a clutch torque target value for clutch 1 (first clutch 74) and a clutch torque target value for clutch 2 (second clutch 75) such that the thermal loads on first clutch 74 (clutch 1) and second clutch (clutch 2) are equalized.

That is, starting clutch torque generation unit 240 calculates clutch torque target values for the two clutches at the start of travel so as to equalize the thermal load (generated heat) on first clutch 74 when the first gear is selected and the thermal load on second clutch 75 when the second gear is selected, by using expressions (9) and (10) for changing the torque capacities of the two clutches while maintaining these torque capacities in a constant proportion.

Further, starting clutch torque generation unit 240 converts the calculated clutch 1 target value and the clutch 2 target value into corresponding clutch positions by using the "clutch position-torque conversion map" read out from storage unit 220. That is, starting clutch torque generation unit 240 calculates a clutch 1 (first clutch 74) position target value corresponding to the clutch 1 target value and a clutch 2 (second clutch 75) position target value corresponding to the calculated clutch 2 target value by using the "clutch position-torque conversion map".

The calculated clutch 1 position target value corresponds to the transmitted torque (clutch torque) in first clutch 74 while the calculated clutch 2 position target value corresponds to the transmitted torque (clutch torque) in second clutch 75.

Starting clutch torque generation unit 240 outputs the calculated clutch 1 position target value to clutch 1 position controller 271 in clutch actuator drive control unit 270 and outputs the calculated clutch 2 position target value to clutch 2 position controller 272 in clutch actuator drive control unit 270.

Then, in clutch actuator drive control unit 270, clutch 1 position controller 271 outputs applied voltage (drive voltage) to first clutch actuator 77, and clutch 2 position controller 272 outputs applied voltage 2 (drive voltage) to second clutch actuator 78, so as to drive-control the clutches 74 and 75.

When the clutch rotational speed difference (the clutch rotational speed difference in first clutch 74, which is the clutch on the lower gear side in the present preferred embodiment) inputted from clutch rotational speed difference obtaining unit 210 is equal to zero or close to zero, starting clutch torque generation unit 240 outputs a command to effect engagement in the clutch on the lower gear side (first clutch 74) to clutch actuator drive control unit 270.

When the clutch rotational speed difference is zero or close to zero, clutch actuator drive control unit 270, receiving the engagement command, drives first clutch actuator 77 by clutch 1 position controller 271 to effect engagement in first clutch 74. Simultaneously, clutch actuator drive control unit 270 drives second clutch actuator 78 by clutch 2 position controller 272 to release the clutch on the near gear side, i.e., second clutch 75 on the second gear side in the present preferred embodiment.

Thus, starting clutch torque generation unit 240 performs "starting clutch interchange" control by calculating transmitted torque (clutch torque capacity) command values for interchange between first clutch 74 and second clutch 75 from the clutch on the higher gear side to the clutch on the lower gear side for "starting clutch interchange" control based on the clutch lever operation amount and the clutch 1 rotational speed difference.

Upon setting the predetermined odd-numbered and even-numbered transmission gears at the start of moving the vehicle, starting clutch torque generation unit 240 changes the torque capacities of the two clutches while maintaining these torque capacities in a constant proportion until the clutch rotational speed difference in the clutch on the lower transmission gear side becomes zero or close to zero, by using the lever operation amount and expressions (9) and (10) to change the torque capacities of the two clutches while maintaining these torque capacities in a constant proportion, as shown in FIG. 4, and thereafter sets the torque capacity of the clutch on the lower transmission gear side to the sum of the torque capacities of the two clutches and also sets the torque capacity of the clutch on the higher transmission gear side to zero.

Shift actuator drive control unit 260 controls shift mechanism 701 based on inputted information to select the transmission gears. More specifically, shift actuator drive control unit 260 drives shift mechanism 701 according to the shift signal inputted from shift switch 106 and, at the start of travel in particular, selects each of the first gear and the second gear.

Shift actuator drive control unit 260 decouples the dogs from the higher gear (second gear) through second clutch actuator 78 after engagement has been effected in first clutch 74 by clutch actuator drive control unit 270.

Clutch actuator drive control unit 270 drives first clutch actuator 77 and second clutch actuator 78 based on inputted information to control drive of first clutch 74 and second clutch 75. That is, the state of engagement in each of first clutch 74 and second clutch 75 (the state between the engaging state and the released state) is controlled by clutch actuator drive control unit 270. By this control, in each of first clutch 74 and second clutch 75, the torque transmitted through the clutch (the torque actually transmitted) is adjusted.

Drive of first clutch 74 and second clutch 75 with clutch actuator drive control unit 270 is performed according to, for example, the inputted shift signal together with driving of shift mechanism 701 with shift actuator drive control unit 260.

This control enables dividing the thermal load on the clutches in engaging at the start of travel so that the thermal loads on the clutches are equalized by operating the two clutch torques in a constant proportion according to the gear ratios by using expressions (9) and (10). Therefore, the thermal load on one clutch can be reduced and the clutch itself can be reduced in size. These effects cannot be obtained in the case of the transmission of the conventional construction that drives one clutch when starting to move a vehicle.

Figure 6:
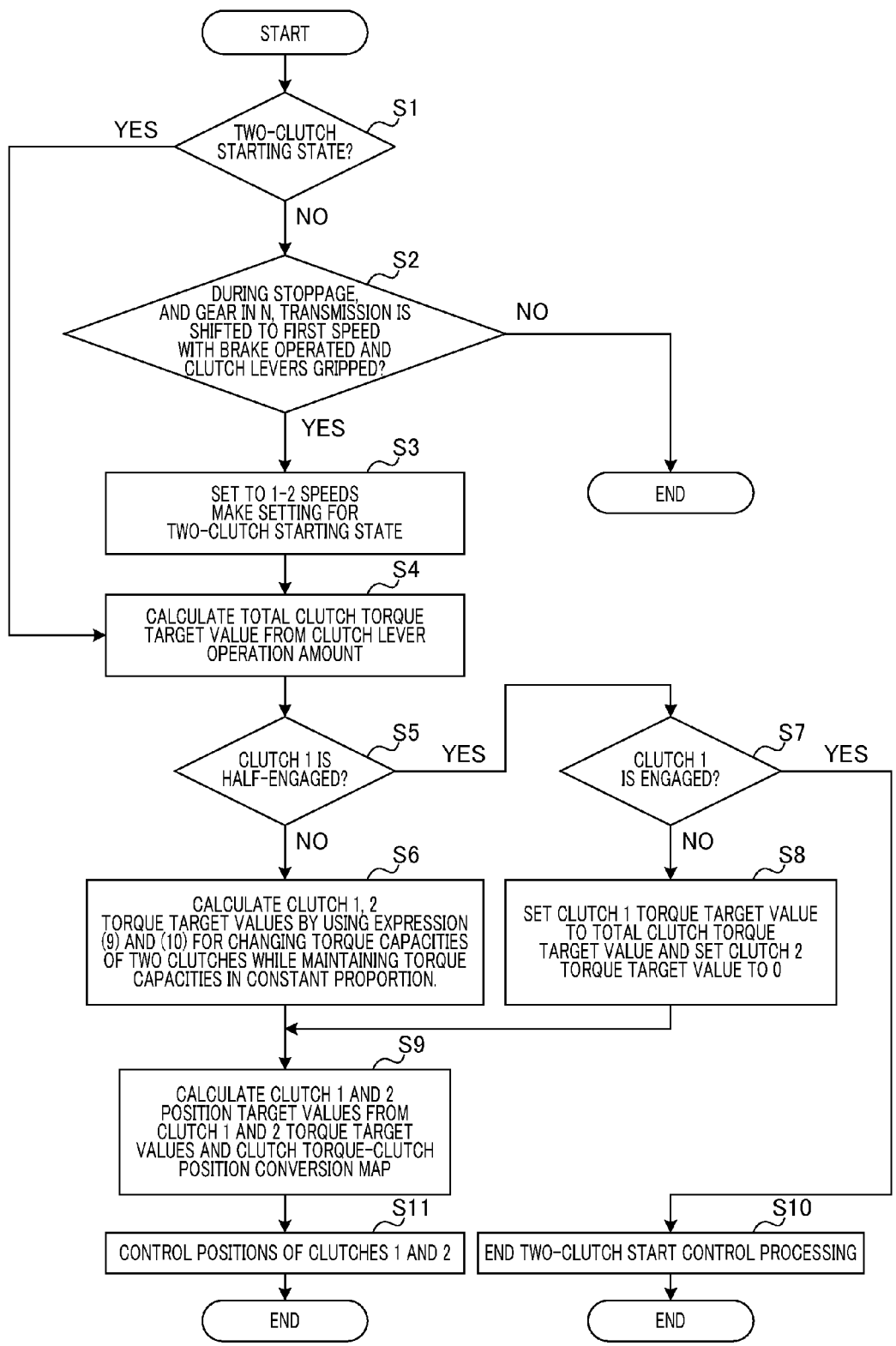
FIG. 6 is a flowchart showing control at the start of moving a vehicle in the transmission apparatus according to a preferred embodiment of the present invention.

FIG. 6 is a flowchart showing control at the start of moving the vehicle in the transmission apparatus according to the present preferred embodiment. "Clutch 1" and "clutch 2" in FIG. 6 refers to first clutch 74 and second clutch 75, respectively.

In step S1, as shown in FIG. 6, transmission control unit 110 (more specifically starting clutch torque generation unit 240) determines whether or not the transmission is in a two-clutch-start standby state based on inputted information. If not in the two-clutch-start standby state, the process proceeds to step S2. If in the two-clutch-start standby state, the process proceeds to step S4.

The two-clutch-start standby state in step S1 is a state in which the odd transmission stage and even transmission stage are set to the first speed and the second speed, the clutches 74 and 75 have been released, and the engine is in an idling state.

In step S2, transmission control unit 110 (starting clutch torque generation unit 240) determines whether or not the present state is stopped, each transmission stage is set in the neutral (N) position, and an operation (shift switch operation) for shifting to the first speed has been performed while a braking operation and gripping of clutch lever 91 are being performed. If the above-described conditions are satisfied in step S2, the process proceeds to step S3.

That is, in step S2, transmission control unit 110 (starting clutch torque generation unit 240) determines whether or not an operation to shift up to the first speed is to be performed based on the signals from sensors 101 to 103, 105, 111, and 121 and shift switch 106, the lever operation signal from lever operation amount detection unit 92 and the shift-up signal from shift switch 106.

In step S3, transmission control unit 110 (starting clutch torque generation unit 240) sets the respective transmission gears to the first-gear and second-gear positions ("1-2" gearing-in). That is, shift mechanism 701 is driven by shift actuator drive control unit 260 to select and engage both the first and second gears.

In step S4, transmission control unit 110 (starting clutch torque generation unit 240) calculates a total clutch torque target value from the clutch lever operation amount indicated by the inputted lever operation signal and the clutch torque conversion map, and the process proceeds to step S5.

In step S5, transmission control unit 110 (starting clutch torque generation unit 240) determines whether or not first clutch 74 is in a half-engaging state. If first clutch 74 is not in a half-engaging state, the process proceeds to step S6. If first clutch 74 is in a half-engaging state, the process proceeds to step S7.

In step S6, starting clutch torque generation unit 240 calculates a clutch torque target value for first clutch 74 and a clutch torque target value for second clutch 75 by using expressions (9) and (10) to change the torque capacities of the two clutches while maintaining these torque capacities in a constant proportion, and the process proceeds to step S9.

In step S7, starting clutch torque generation unit 240 determines whether or not first clutch 74 (clutch 1) is in an engaging state. If first clutch 74 is not in the completely engaging state, the process proceeds to step S8. If first clutch 74 is in the completely engaging state, the process proceeds to step S10, two-clutch start control processing ends and then the process ends.

In step S8, starting clutch torque generation unit 240 sets the clutch torque target value for the first clutch (clutch 1) to the total clutch torque target value (the value necessary for starting the vehicle) and also sets the clutch torque target value for the second clutch (clutch 2) to zero, and the process proceeds to step S9. The value necessary for starting the vehicle is a value at which the torque is transmitted to the rear wheel through drive shaft 730 to rotatingly drive the rear wheel so that the vehicle moves.

In step S9, starting clutch torque generation unit 240 calculates a clutch position target value for first clutch (clutch 1) 74 and a clutch position target value for second clutch (clutch 2) 75 from the clutch torque target value for first clutch (clutch 1) 74, the clutch torque target value for second clutch (clutch 2) 75, and the clutch torque-clutch position conversions map, and the process proceeds to step S11.

In step S11, starting clutch torque generation unit 240 in transmission control unit 110 controls the positions of first clutch 74 and second clutch 75.

More specifically, in step S11, starting clutch torque generation unit 240 inputs the calculated clutch position target values for first clutch (clutch 1) 74 and second clutch (clutch 2) 75 to clutch 1 controller 271 and clutch 2 controller 272 in clutch actuator drive control unit 270. Clutch actuator drive control unit 270 then applies voltages 1 and 2 to first clutch actuator 77 and second clutch actuator 78, respectively, to drive first clutch 74 and second clutch 75, so as to control the positions (clutch positions). This control loop is executed periodically (e.g., at intervals of about 5 ms).

Figure 7:
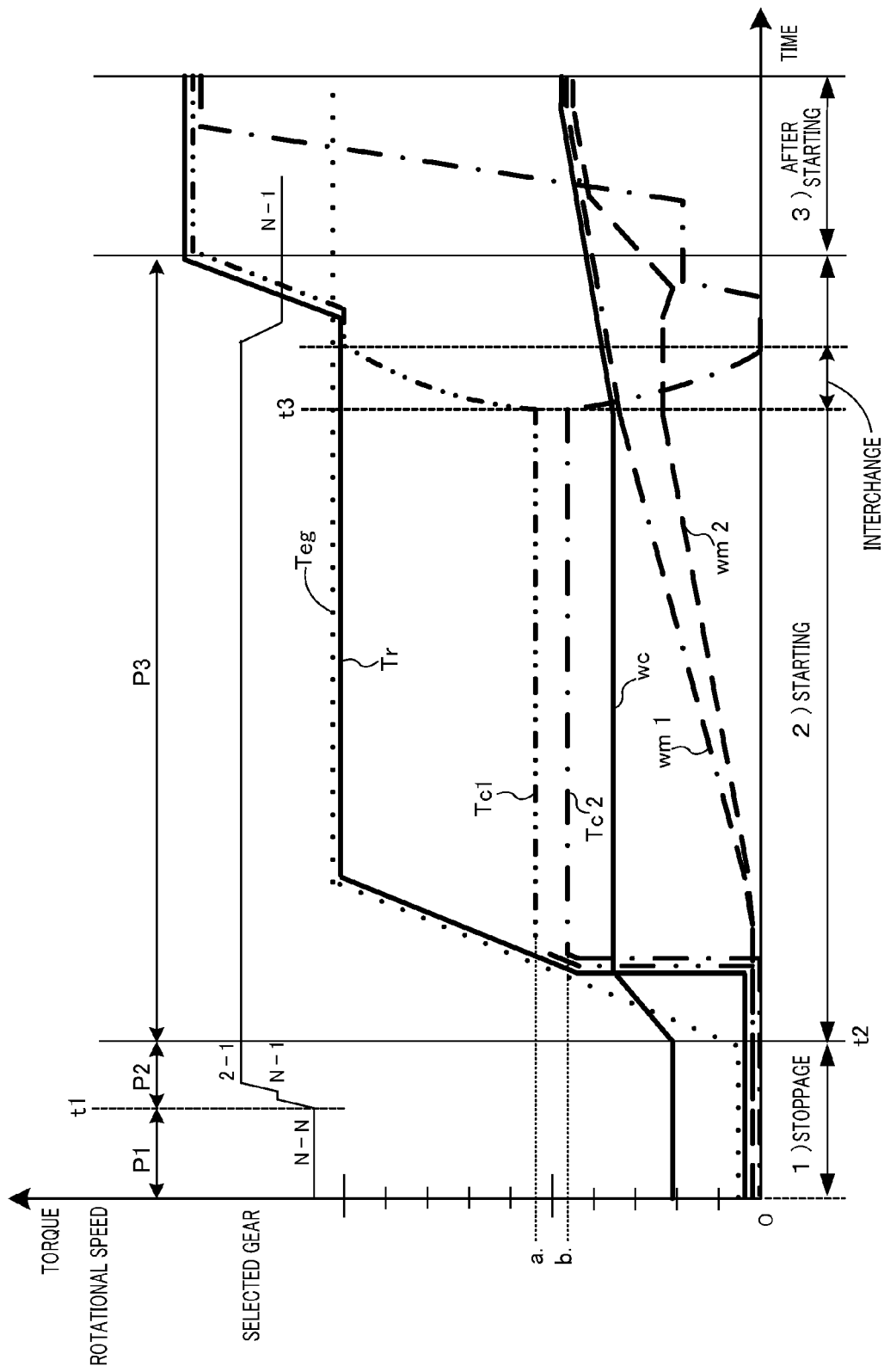
FIG. 7 is a timing chart showing changes in transmitted torque capacities of clutches when drive of the vehicle is controlled in the dual clutch transmission apparatus according to a preferred embodiment of the present invention.

FIG. 7 is a timing chart showing changes in transmitted torque capacities of the clutches when drive of the vehicle is controlled in the dual clutch transmission apparatus according to a preferred embodiment of the present invention. Reference is also made as required to the schematic diagram in FIG. 4 of the transmission for explaining start control in the dual clutch transmission apparatus.

The control apparatus (more particularly transmission control unit 110 and engine control unit 120) controls transmission 70 in correspondence with the states: "1) stoppage", "2) starting" and "3) after starting" of the vehicle, as indicated in periods: before-starting stoppage period P1, two-clutch start preparatory state period P2, and starting period P3. The "1) stoppage" state of the vehicle corresponds to the above-described "two-clutch start standby state".

First, in the before-starting stoppage when the vehicle is in "1) stoppage", transmission control unit 110 moves the transmission gears in the odd and even stages to the neutral (N) position. At this time, first clutch 74 and second clutch 75 are engaged since clutch lever 91 is not gripped.

The engine is maintained in an idling state by engine control unit 120, and an input signal representing a driver's operation is awaited.

At time t1, when clutch lever 91 is gripped and when a shift-up operation (an operation on the shift switch or the shift pedal) is performed, the transmission gears are shifted to 1-2 (gearing in for the first and second speeds) and the operation is completed.

That is, at time t1, transmission control unit 110 moves first clutch 74, second clutch 75, and the transmission gears by first clutch actuator 77, second clutch actuator 78, and drive motor 140 of shift mechanism 701 in response to the input signals from lever operation amount detection unit 92 and shift switch 106. First clutch 74 and second clutch 75 are thereby released. Simultaneously, the first gear, which is a transmission gear on first clutch 74 side, is set (geared in), and the second gear, which is a transmission gear on second clutch 75 side, is set, so as to complete a gear shift.

When the driver operates the accelerator and clutch lever 91 (at point t2), the signals indicating this operation are inputted from accelerator opening sensor 101 and lever operation amount detection unit 92 to transmission control unit 110. When the accelerator is operated so that its value exceeds a predetermined threshold value, transmission control unit 110 starts to move the vehicle in cooperation with engine control unit 120 by using the inputted signals, expressions (9) and (10) to change the torque capacities of the two clutches while maintaining these torque capacities in a constant proportion and the "clutch lever operation amount-torque conversion map".

That is, in this start control, transmission control unit 110 calculates as a total clutch torque target value a torque value into which the lever operation amount is converted. Transmission control unit 110 then calculates and sets a clutch torque target value for first clutch 74 (see a. in FIG. 7, a<1) and a clutch torque target value for second clutch 75 (see b. in FIG. 7, b=1−a) based on the calculated total clutch torque target value, expressions (9) and (10) to change the torque capacities of the two clutches while maintaining these torque capacities in a constant proportion and the rotational speed difference in first clutch 74.

Transmission control unit 110 thereafter drives first clutch 74 and second clutch 75 by first clutch actuator 77 and second clutch actuator 78 so that the calculated clutch torque target value for first clutch 74 and the calculated clutch torque target value for second clutch 75 are reached.

First clutch 74 is controlled so that when the rotational speed difference in first clutch 74 becomes close to zero (t3: a start of interchange), the clutch torque target value for first clutch 74 becomes equal to the total clutch torque target value (total torque target value), while second clutch 75 is controlled so that the clutch torque target value for second clutch 75 becomes zero. That is, clutch interchange is made. As a result, in "3) after starting", acceleration at the first speed is performed.

Thus, at the start of moving the vehicle, the predetermined odd-numbered and even-numbered transmission gears are selected by shift mechanism 701 and, in this state, the torque capacities of the two clutches are changed while being maintained in a constant proportion. When the clutch rotational speed difference in the clutch on the lower transmission gear side becomes zero or close to zero, the torque capacity of the clutch on the higher transmission gear side is set to the torque target value 0 corresponding to the completion of interchange at the start of travel, while the torque capacity of the clutch on the lower transmission gear side is set to the sum of the torque capacities of the two clutches.

That is, as shown in FIG. 7, at the start of moving the vehicle, the torque capacities $Tc1$ and $Tc2$ of the two clutches are changed while being maintained in a constant proportion. Accordingly, the two clutches are operated in parallel with each other while maintaining the constant proportion shown by $Tc1$ and $Tc2$ in FIG. 7, after the start of moving the vehicle until the clutch torques reach the torque target values (to be set to zero on the second-gear side, and to be set to the total torque capacity on the first-gear side) at the time of completion of starting interchange.

Thus, at the start of travel, the thermal load produced during the engaging operation of the clutch, i.e., the operation to change the transmitted torque (the clutch torque capacity) can be divided in a plurality of clutches, so that the thermal load per clutch can be reduced. The above-described constant proportion is determined by a function of the gear ratio. If the $Tc1$ and $Tc2$ are in a constant proportion, the thermal loads are equalized. That is, the thermal load per clutch is minimized.

Thus, the durability of the clutches can be improved by reducing the thermal load per clutch at the start of travel, and the transmission itself, having dual clutches, can also be reduced in size and in weight by reducing the size of each clutch. Also, the vehicle itself, including this transmission, can be reduced in weight and the space in which the transmission is mounted can be reduced.

In the present preferred embodiment, the torque capacities $Tc1$ and $Tc2$ of the two clutches are changed while being maintained in a constant proportion, after the start of moving the vehicle until the clutch torques reach the torque target values (to be set to zero on the second-gear side, and to be set to the total torque capacity on the first-gear side) at the time of completion of starting interchange at which the rotational speed difference on the lower gear side decreases. Therefore, there is no need for control using an exponential function or the like. Advantageously, it is therefore not necessary for starting clutch torque generation unit 240 to perform an exponential-function calculation or the like, or it is not necessary for storage unit 220 to store a map for such calculation.

Further, the present preferred embodiment can be applicable to manual starting performed by a user using a by-wire clutch lever. In the case of designing a transmission capable of manual starting, there is a need to consider irregular ways of use that can be applied with no problem to automatic starting. For example, if a user performs an irregular operation such as maintaining a half-clutch state without starting the vehicle, there is a possibility of one of the two clutches, e.g., the clutch on the second-gear side absorbing heat so that its lifetime is reduced. In the present preferred embodiment, since the two clutches are operated in parallel with each other in a constant proportion shown by $Tc1$ and $Tc2$, the produced thermal load can be divided in the plurality of clutches, so that thermal load per clutch can be reduced. Therefore the present preferred embodiment can be suitable for manual starting as well as for automatic starting.

In the present preferred embodiment, first clutch 74 functions as a clutch on the lower transmission gear side at the start of moving the vehicle, while second clutch 75 functions as a clutch on the higher transmission gear side. However, the preferred embodiments of the present invention are not limited to this arrangement. That is, by setting second clutch 75 as the clutch on the lower transmission gear side and first clutch 74 as the clutch on the higher transmission gear side, transmission may be shifted from the transmission gear (second gear) on second clutch 75 side to the transmission gear (first speed) on first clutch 74 side.

The entire contents of the specification, drawings and abstract contained in Japanese Patent Application No. 2010-260157, filed on Nov. 22, 2010 are incorporated herein by reference.

The dual clutch transmission apparatus and the start control method according to the preferred embodiments of the present invention provide the advantages of reducing the thermal loads on the clutches at the start of travel and thereby improving the durability and reducing the weight of each clutch, and are useful as a control unit mounted on a motorcycle including a dual clutch transmission.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A dual clutch transmission apparatus comprising:
   a first clutch that transmits or blocks a torque from a crankshaft to a first main shaft;
   a second clutch that transmits or blocks a torque from the crankshaft to a second main shaft;
   an output shaft to which the torque on the first main shaft is transmitted through an odd-numbered transmission gear mechanism including odd-numbered transmission gears, and to which the torque on the second main shaft is transmitted through an even-numbered transmission gear mechanism including even-numbered transmission gears;
a transmission mechanism that changes meshing between the odd-numbered transmission gears in the odd-numbered transmission gear mechanism and the even-numbered transmission gears in the even-numbered transmission gear mechanism; and
   a transmission control unit programmed to change a transmission path for the torque by controlling the transmission mechanism, the first clutch, and the second clutch; wherein
   at a start of moving a vehicle, in a state in which a predetermined odd-numbered transmission gear and a predetermined even-numbered transmission gear are selected, the transmission control unit is programmed to change torque capacities of the first and second clutches while maintaining the torque capacities in a constant proportion until a clutch rotational speed difference in a clutch, among the first clutch and the second clutch, on a lower transmission gear side becomes zero or close to zero, thereafter to set the torque capacity of the clutch on the lower transmission gear side to a sum of the torque capacities of the first and second clutches, and also to set the torque capacity of a clutch, among the first clutch and the second clutch, on a higher transmission gear side to zero.

2. The dual clutch transmission apparatus according to claim 1, wherein the constant proportion is set according to a gear ratio of the selected odd-numbered transmission gear and the selected even-numbered transmission gear.

3. The dual clutch transmission apparatus according to claim 1, wherein the lower transmission gear is a first gear, and the higher transmission gear is a second gear.

4. A motorcycle comprising:
   the dual clutch transmission apparatus according to claim 1.

5. A start control method for a dual clutch transmission apparatus including a first clutch that inputs a torque transmitted from a crankshaft to a first main shaft, and that outputs the torque to a drive wheel through an odd-numbered transmission gear mechanism including odd-numbered transmission gears, and a second clutch that inputs a torque transmitted from the crankshaft to a second main shaft, and that outputs the torque to the drive wheel through an even-numbered transmission gear mechanism including even-numbered transmission gears, the method comprising:
   a step of selecting a predetermined odd-numbered transmission gear in the odd-numbered transmission gear mechanism and a predetermined even-numbered transmission gear in the even-numbered transmission gear mechanism;
a step of controlling the first clutch and the second clutch and changing torque capacities of the first and second clutches while maintaining the torque capacities of the first and second clutches in a constant proportion until a clutch rotational speed difference in a clutch, among the first clutch and the second clutch, on a lower transmission gear side becomes zero or close to zero; and
   a step of setting the torque capacity of the clutch, among the first clutch and the second clutch, on the lower transmission gear side to a sum of the torque capacities of the first and second clutches and setting the torque capacity of a clutch, among the first clutch and the second clutch, on a higher transmission gear side to zero when the clutch rotational speed difference is zero or close to zero.

* * * * *